Figure 3:
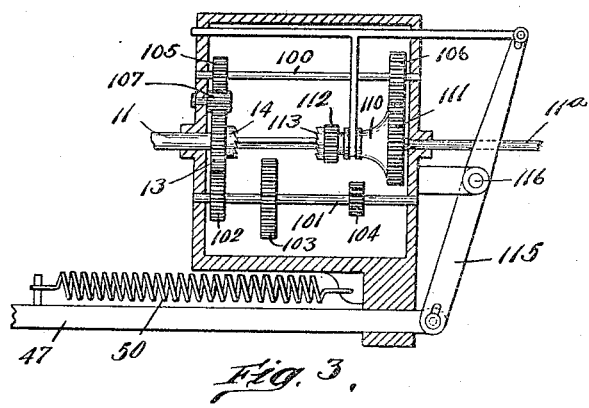

R. A. RALPH.
TRANSMISSION GEARING AND SHIFTING MEANS THEREFOR.
APPLICATION FILED APR. 21, 1916.
1,212,398.
Patented Jan. 16, 1917.
2 SHEETS—SHEET 1.
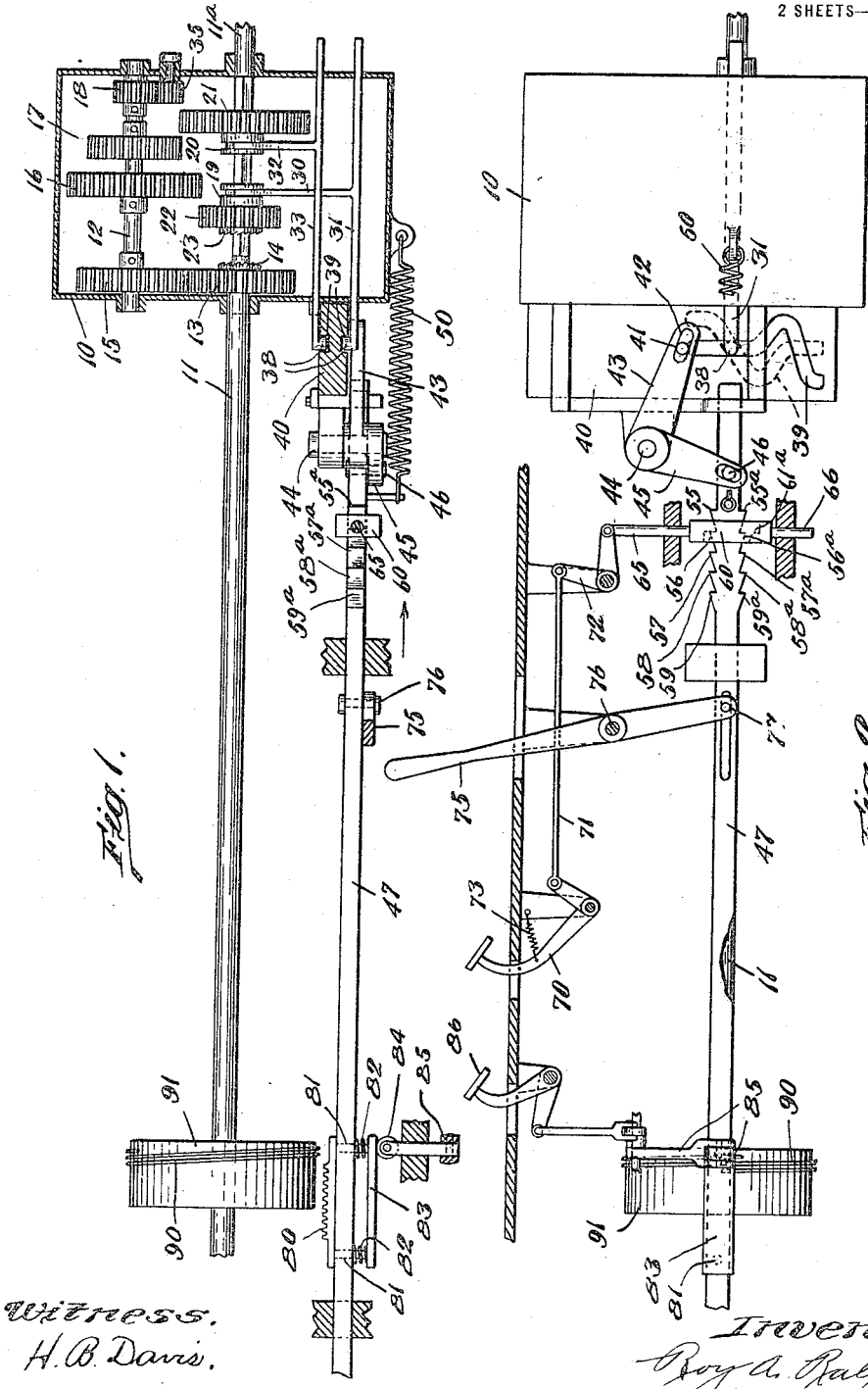

R. A. RALPH.
TRANSMISSION GEARING AND SHIFTING MEANS THEREFOR.
APPLICATION FILED APR. 21, 1916.

1,212,398.

Patented Jan. 16, 1917.
2 SHEETS—SHEET 2.

Witness.
H. B. Davis.

Inventor,
Roy A. Ralph
by Noyes & Harriman
Attys.

UNITED STATES PATENT OFFICE.

ROY A. RALPH, OF AUBURN, NEW YORK.

TRANSMISSION-GEARING AND SHIFTING MEANS THEREFOR.

1,212,398.  Specification of Letters Patent.  Patented Jan. 16, 1917.

Application filed April 21, 1916. Serial No. 92,737.

*To all whom it may concern:*

Be it known that I, ROY A. RALPH, a citizen of the United States, residing at Auburn, in the county of Cayuga and State of New York, have invented an Improvement in Transmission-Gearing and Shifting Means Therefor, of which the following is a specification.

This invention relates to transmission gearing for automobiles, and shifting-means therefor.

The essential object of the invention is the construction of the shifting-means whereby it is adapted for operation by a spring or other actuator to shift the transmission gearing into different speed positions, thus to obviate the necessity of performing this work by hand; and to provide controlling-means for the shifting-means which is arranged within convenient reach of the driver and adapted to be operated by him to release the shifting-means, permitting it to operate.

Another object of the invention is the provision of controlling-means for the shifting-means, adapted for repeated operation, whereby the shifting-means may be successively operated to shift the gearing from neutral to different speed positions.

Another object of the invention is the provision of means for connecting the shifting-means with a motor-driven element by which it may be returned to normal or neutral position; and the provision of controlling-means therefor which is adapted to be arranged within convenient reach of the driver.

Another object of the invention is the provision of manual means adapted to move the shifting-means from any of its advance or speed positions in the opposite directions more or less, as may be desired, against the force of the actuator, to correspondingly shift the transmission gearing, thus admitting of the gearing being shifted from a high-speed position to a lower-speed position, or to neutral. Said manual means may be employed for returning the shifting-means instead of the power-driven means, although both are or may be provided so that it is optional with the driver, which he will use. If he desires to move the shifting-means from any speed-position to neutral, he may employ the power-driven means, but if he desires to move the shifting-means from a certain speed-position to a lower speed-position, he may use the manual-means.

Another object of the invention is the construction and arrangement of the manual operable means which is provided for returning the shifting-means from any advanced position more or less, or to neutral, whereby it may be also employed for moving the shifting-means into reverse position and correspondingly move the transmission gearing.

Another object of the invention is the construction and arrangement of the controlling-means for the shifting-means, by which the shifting-means may be moved from reverse position to neutral, as well as into its different speed positions.

The form of transmission-gearing to which my shifting-means is especially applicable is generally known as of the progressive type, and is constructed and arranged to be operated by my improved shifting-means.

The main shifting element of the shifting-means here shown for illustrating my invention consists of a horizontal bar adapted to be moved in one direction by a spring or other actuator, which movement is controlled by step-by-step or escapement means, so that upon repeated operations of a pedal or other member within convenient reach of the driver, said element will be moved progressively by the spring, step by step, throughout its range of motion, thus to shift the transmission gearing from normal, successively, to the different speed positions; and said shifting bar and its associated controller may be also arranged for movement from reverse position to normal, such movement being in the same direction, as its movement from normal to the different speed positions. The shifting-bar is arranged in juxtaposition to a motor driven shaft, and is adapted to be moved into and out of engagement with an element driven thereby, so that when in engagement with said power-driven element it may be returned from any advanced or speed position to neutral, and such connecting-means is adapted to be operated by a pedal or other member within convenient reach of the driver.

The manual operating means which is associated with the shifting-means may consist of a pivoted lever, connected with the shifting-bar, which is arranged within easy reach of the driver, and which is adapted to move said shifting-bar backward, or in a direction in opposition to the force of its actuating spring; and said lever is arranged to move said shifting-bar throughout its entire range of motion.

The transmission gearing comprises gears, some of which are movable axially on their carrying shafts, and others are not axially movable, and means engaging the axially movable gears for moving them positively in both directions, and means operatively connected with the shifting-bar for moving the gear-engaging means.

Figure 4:
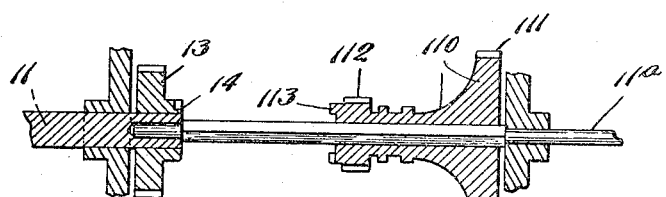
Figures 5, 6:
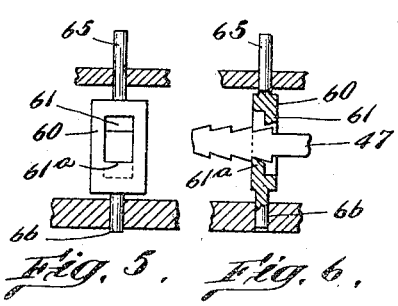
Figure 7:
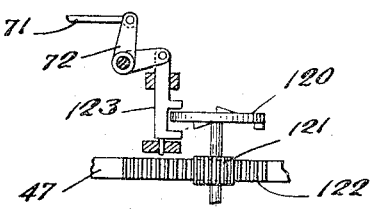

Figure 1 is a plan view of my improved gear-shifting mechanism associated with a transmission gearing of the progressive type, the gears being in neutral position. Fig. 2 is a side elevation of the same. Fig. 3 is a side elevation of a modified form of transmission gearing which may be employed. Fig. 4 is an enlarged sectional detail of a portion of the transmission gearing shown in Fig. 3. Figs. 5 and 6 are sectional details of the escapement means associated with and controlling the main shifting element or bar. Fig. 7 is a detail view of another form of escapement mechanism which may be employed.

In the present embodiment of my invention, see Figs. 1, 2, 5, and 6, 10 designates a housing for the transmission gearing, which latter may be of any usual or suitable construction, and here shown as of the progressive type, and, as here shown, comprises the transmision-shaft 11, the propeller-shaft 11ª, the jack-shaft 12, the gear 13, fixed to the transmission-shaft having a clutch element 14 arranged thereon, a gear 15 fixed to the jack-shaft and engaging said gear 13, whereby the jack-shaft is rotated by the transmission-shaft; three gears 16, 17, and 18 fixed to the jack-shaft, to be rotated thereby, and arranged at suitable places thereon; two sleeves 19 and 20 mounted on the propeller-shaft and movable axially thereon, but rotatable therewith, one of the sleeves, as 20, carrying a gear 21, normally arranged opposite the space between the gears 17 and 18, and adapted, upon movement of the sleeve in one direction, to engage one of the gears, as 17 for instance, and upon movement in the other direction to engage the other gear, as 18 for instance; the other sleeve, as 19, carrying the gear 22, and also a clutch element 23, this gear being normally arranged opposite the space at one side of the gear 16, and its clutch element 23 being normally remote from the clutch element 14, and upon movement of said sleeve in one direction its gear 22 is adapted to engage the gear 16, and in the other direction its clutch element 23 is adapted to engage the clutch-element 14. Each sleeve is adapted for engagement with a shifter; and, as here shown, each sleeve has a circumferential groove adapted to receive the bifurcated end of an arm on a shifter.

30, 32 designate the arms of the shifters, and 31, 33 are horizontal bars from which said arms extend, and said bars are supported in suitable bearings in the walls of the housing and are movable longitudinally therein to move the sleeves.

There is also a pinion 35 in engagement with the gear 18, and the axially movable gear 21 is movable into and out of engagement with said pinion. When the gear 21 is in engagement with the pinion 35 the propeller-shaft 11ª is adapted for reverse rotation. When the gear 21 is moved into engagement with the gear 17, the propeller-shaft is adapted for rotation forward at low speed. When the gear 22 is in engagement with the gear 16, the propeller-shaft is adapted for rotation at second or intermediate speed. When the clutch element 23 is in engagement with the clutch element 14, the propeller-shaft is directly connected with the transmission-shaft, and is rotatable at high speed.

The ends of the bars 31 and 33 have lateral projections 38, which enter and work in cam grooves 39, 39, arranged in the opposite sides of a block 40, arranged to slide vertically in a guide-way provided for it on the side of the housing. A stud 41 is extended from the block 40, which enters and works in a slot 42 formed in one arm 43 of a bell-crank lever, pivoted at 44, the other arm 45 of said lever having a slot which receives a pin 46, extended from a bar 47, which is suitably supported and is movable longitudinally. It will be observed that upon longitudinal movement of said bar in one or the other direction the bell-crank lever will be moved correspondingly on its pivot and the block will be moved to, in turn, move the shifters 31 and 33, to correspondingly move the gears.

The actuator for the shifting-bar, as here shown, consists of a strong retractive spring 50, which is connected at one end to the bar and at the other to the transmission housing or other adjacent part of the automobile. Said actuator constantly acts to pull the bar in one direction, as indicated by the arrow, Fig. 1, for shifting the gears, as for instance, from reverse to neutral and from neutral to the different speed positions, three such speed positions being here shown, low, intermediate, and high-speed positions. The shifting-bar 47 is or may be moved in the other direction against the force of the spring 50 by manual or other means, as will be later explained. To hold the shifting-bar in any of its different positions against the force of its actuator 50, and to control its movement in one direction intermittently and to permit continuous movement thereof in the other direction, an escapement mechanism is provided.

The escapement-mechanism shown in Figs. 1, 2, 5 and 6, comprises two longitudinal series of escapement teeth, designated as 55, 56, 57, 58, 59, and 55ª, 56ª, 57ª, 58ª, 59ª, located on opposite sides of the shifting-member, and a pallet block 60, having pallets 61 and 61ª, which respectively engage said series of teeth. The pallet block is made with a hole through it for the shifting bar and has its pallets extended inward from the top and bottom walls of said hole respectively, and said block is designed to be reciprocated vertically and its pallets to alternately engage the two series of escapement teeth, hence said pallets are offset with respect to each other. The engagement of the pallet 61, with the respective escapement teeth 55, etc., holds the transmission gears in the respective positions of reverse, neutral, and low, intermediate, and high-speed positions. The escapement teeth and pallets are correspondingly beveled, so that the teeth may freely pass or slide by the pallets when the shifting-bar is being returned in a direction against the force of the actuating-spring, by the manual or other means, to be later described, to correspondingly shift the gears, as, for instance, from high to intermediate, intermediate to low, low to neutral, or neutral to reverse. This pallet block is slidably supported by studs 65 and 66, having suitable bearings, and is reciprocable at right-angles to the shifting-bar and is operated by a foot-pedal 70 through the medium of link-rod 71, and bell-crank 72. A retractive spring 73 is secured at one end of a crank-arm on the pedal 70, and at the end to the floor or other convenient part of the vehicle, which normally holds the pedal in elevated position and the pallet-block in depressed position with its pallet 61, in engagement with one of the escapement teeth on the upper side of the shifting-bar. Normally, the gears are assumed to be in neutral position, as represented in Fig. 2, and to shift them to low speed forward the pedal 70 is depressed against the tension of its return spring 73, to lift the pallet-block and disengage the pallet 61 from the neutral escapement tooth 56, allowing the actuator 50 to pull the shifting-bar 47 rearwardly. The shifting-bar moves only a short distance, as, upon the lifting of the pallet-block, the pallet 61ª moves into the path of the escapement tooth 57ª, before the pallet 61 entirely disengages the escapement tooth 56. The pedal 70 must, therefore, be disengaged to allow the spring 73 to lift it and to depress the pallet-block, whereupon, the pallet 61ª disengages the tooth 57ª, and the pallet 61 moves into the path of the next tooth 57, and allowing actuator 50, to move the shifting-bar 47, along until the pallet 61 engages said tooth 57 when the low-speed gears 21 and 17 will mesh. In this manner the pallet block may be intermittently operated by depressing and releasing pedal 70 to permit the actuator 50 to shift the gears from reverse to neutral, and from neutral to the different speed positions. When the gears are to be shifted, against the force of the actuator 50, from high to intermediate, intermediate to low, low to neutral, or neutral to reverse, a hand-lever 75 is or may be employed. This hand-lever is intermediately pivoted at 76 to a suitable support, and has a pin-and-slot connection 77 with the shifting-bar 47. A rearward pull on the hand-lever will slide the shifting-bar forward against the force of actuator 50, and the gears may thus be shifted from high to intermediate, intermediate to low, low to neutral, or neutral to reverse. During such forward movement of the shifting-bar the escapement teeth freely pass or slide by the pallets, and when the hand-lever is released, upon the shifting of the gears to any predetermined position, the pallet 61 will engage with one of the escapement teeth to hold the gears in such position.

In order that the gears may be mechanically, instead of manually, shifted back to neutral position from high, intermediate, or low-speed positions, I may employ power driven means, as for instance a rack-bar 80, which is connected to the bar 47, by guide-pins 81, and is normally held in engagement therewith by expansive springs 82, surrounding the pins. A bar 83 connects the pins and is disposed for engagement by a roller 84, carried by one arm 85 of a bell-crank lever, the other arm of which is connected by link and lever means with a controlling pedal 86. This pedal 86 may be depressed to move the rack-bar into engagement with a worm 90 on the periphery of the engine fly-wheel 91, or other power driven member. The rack-bar is of such length that the worm disengages it when the transmission gears reach neutral position, at which time the pallet-block engaging the escapement teeth, holds the gears in neutral position.

In lieu of the transmission gearing shown in Fig. 1, the form shown in Figs. 3 and 4 may be employed, wherein there are two jack-shafts 100 and 101, arranged in parallel relation with the transmission shaft 11, and propeller shaft 11ª, and there is the same gear 13 with clutch element 14 fixed to the transmission shaft; and there are three gears 102, 103, and 104, fixed to the jack-shaft 101, and there are gears 105, 106, fixed to the jack-shaft 100, and a pinion 107 is arranged between the gears 13 and 105. There is also a sleeve 110, arranged and axially movable on the propeller shaft 11ª, said sleeve bearing a gear 111 which engages a gear 106, and is movable into engagement with the gear 104, and a gear 112, which is movable into engagement with a gear 103, and a clutch element 113 which is movable into engagement with the clutch element 14. But one sliding shifter is here shown, which engages a sleeve and a rocking-bar 115 pivoted at 116, which connects the shifter with the shifting-bar 47.

In lieu of the escapement-mechanism shown in Figs. 5 and 6, the escapement-mechanism shown in Fig. 7 may be employed, it comprising an escapement-wheel 120, arranged on a shaft bearing a pinion 121, which engages a rack 122, on the shifting-bar 47, and a double detent member 123 is arranged for coöperation with said escapement wheel, it being connected with the bell-crank lever 72, and link 71, and foot-pedal 70, by which it is operated.

I claim:—

1. The combination with a transmission gearing having two gear-shifters, of a cam-block having two cam-grooves for engaging said gear-shifters, movement of the block acting to move one of said gear-shifters to shift the gearing from neutral to reverse, and from neutral to low speed position, and to move the other gear-shifter to shift the gearing from neutral to intermediate speed position, and from neutral to high speed position, and means to move said cam block back and forth.

2. The combination with a transmission gearing having two gear-shifters, of a movable element to which both of said gear-shifters are connected and by which they are moved to shift the gearing, a longitudinally reciprocating shifting-bar connected with said movable element, actuating-means to move said bar in one direction, controlling-means therefor, and means for returning said bar against the force of its actuating-means.

3. The combination with a transmission gearing having two gear-shifters, of a movable element to which both of said shifters are connected and by which they are moved to shift the gearing, a longitudinally reciprocating shifting-bar connected with said movable element, actuating-means to move said bar in one direction, controlling-means therefor, pedal-controlled escapement mechanism associated with said bar for controlling its movement in one direction, and means for returning said bar against the force of its actuating means.

4. The combination with a transmission gearing having two gear-shifters, of a movable element to which both of said shifters are connected and by which they are moved to shift the gearing, a longitudinally reciprocating shifting-bar connected with said movable element, actuating-means to move said bar in one direction, controlling-means therefor, and hand-operated means for returning said bar throughout its entire range of motion.

5. The combination with a transmission gearing having two gear-shifters, of a movable element to which both of said gear-shifters are connected and by which they are moved to shift the gearing, a longitudinally reciprocating shifting-bar connected with said movable element, actuating-means to move said bar in one direction, controlling means therefor, hand operated means for returning said bar throughout its entire range of motion, and power-operated means for returning said bar from any of its speed positions to neutral.

6. The combination with a transmission gearing, of spring-actuated shifting-means for the gearing, and controlling-means therefor adapted for repeated operation, power-operated means for returning said shifting-means against the force of the actuating-spring and for correspondingly shifting the gearing, and a pedal controller for said power-operated means.

7. The combination with a transmission gearing, of shifting means for the gearing, controlling-means for the shifting-means by which to control the shifting of the gearing from reverse to neutral and from neutral to the different speed positions, means for returning the shifting-means from any speed position retrogressively to neutral and from neutral to reverse, and other means for returning the shifting-means from any speed position retrogressively to neutral.

8. The combination with a transmission gearing, of shifting-means for the gearing, controlling-means for the shifting-means by which to control the shifting of the gearing from reverse to neutral and from neutral to the different speed positions, means for returning the shifting-means from any speed position retrogressively to neutral and from neutral to reverse, and pedal-controlled power-operated means for returning the shifting-means from any speed position retrogressively to neutral.

9. The combination with a progressive transmission gearing, of spring-actuated shifting-means for the gearing, controlling-means adapted for holding said gearing in reverse and neutral and different speed positions, adapted for repeated operation, to permit shifting of the gearing from reverse to neutral, and from neutral to the different speed positions, successively, and means for returning the shifting means against the force of the actuating-spring from any speed position to neutral, and means for moving said shifting-means from neutral to reverse position and for correspondingly shifting the gearing.

10. The combination with a progressive transmission gearing, of a shifting-bar for the gears, means acting to move the bar in one direction to shift the gearing progressively from reverse through neutral to different speed positions, means for moving the bar in the opposite direction, in opposition to said moving means from high-speed position through intermediate and low-speed positions to neutral, and correspondingly shift the gearing, means for holding the bar in any given position, and means controlling said holding means, whereby the bar may be released to move in response to the moving means, and means for moving said bar from neutral into reverse position.

11. The combination with a transmission gearing and engine of a motor vehicle, of shifting-means for the gearing adapted for operation in one direction to shift the gears, manually operable controlling-means therefor, and means adapted for actuation by the engine for moving the shifting-means in the other direction for correspondingly shifting the gearing.

12. The combination with a transmission gearing and engine of a motor vehicle, of shifting-means for the gearing adapted for operation in one direction to shift the gears, manually operable controlling-means therefor, and pedal-controlled means adapted for actuation by the engine for moving the shifting means in the other direction for correspondingly shifting the gearing.

13. The combination with a progressive transmission gearing and engine of a motor vehicle, of a shifting-bar for the gearing, means acting to move the bar in one direction for shifting the gearing, controlling means therefor, and means adapted to be actuated by the engine for moving the bar in the other direction.

14. The combination with a progressive transmission gearing and engine of a motor vehicle, of a shifting-bar for the gearing, means acting to move the bar in one direction for shifting the gearing, controlling-means therefor, and means adapted to be actuated by the engine for moving the bar in the other direction, and correspondingly shift the gearing.

15. The combination with a progressive transmission gearing and engine of a motor vehicle, of a shifting-bar for the gearing, means acting to move the bar in one direction for shifting the gearing, controlling-means therefor, and means adapted to be actuated by the engine for moving the bar in the other direction, and correspondingly shift the gearing and restore the actuating-means.

16. The combination with a progressive transmission gearing and engine of a motor vehicle, of a shifting-bar for the gearing, a spring to move said bar in one direction, an escapement-mechanism associated with the shifting-bar for controlling its spring-actuated movement, and means adapted for actuation by the engine and for moving said bar in the other direction to correspondingly shift the gearing and restore the spring.

17. The combination with a progressive transmission gearing and engine of a motor vehicle, of a shifting-bar for the gearing, means acting to move the bar in one direction for shifting the gearing, controlling means therefor, means adapted to be actuated by the engine for shifting the bar from high speed to neutral position and correspondingly moving the gearing, and manually operable means for shifting the bar from neutral to reverse position and correspondingly moving the gearing.

18. The combination with a progressive transmission gearing and engine of a motor vehicle, a shifting-bar for the gearing, means acting to move said bar in one direction to shift the gearing, controlling-means therefor, a motor-driven actuating member and manually operable means adapted to connect the shifting-bar with said actuating-member, whereby the bar is moved in the other direction and the gearing correspondingly shifted, and the actuating-spring reset.

19. The combination with a progressive transmission gearing and engine of a motor vehicle, of a shifting-bar for the gearing, means acting to move said bar in one direction, controlling-means therefor, a rack-bar connected to the shifting-bar and movable with respect thereto, a worm driven by the engine, and means for moving the rack-bar into engagement with the worm, whereby the worm will cause movement of the bar from high, intermediate, or low-speed position to neutral position.

20. The combination with a progressive transmission gearing, of a shifting-bar for the gearing, means acting to move said bar in one direction, a pallet-block movable in a path at right angles to the bar, escapement teeth formed on the bar for engagement by the pallet-block, whereby the bar may be held in any given position of the gearing, and means for maintaining the pallet-block in operative engagement with the teeth.

21. The combination with a progressive transmission gearing, of a shifting-bar for the gearing, means to move said bar, an intermittently movable pallet-block movable in a path at right angles to the bar and engageable therewith for controlling movement of the bar.

22. The combination with a progressive transmission gearing, of a shifting-bar for the gearing, means to move the bar, a pallet-block movable in a path at right angles to the bar and engageable therewith for holding the gears in any set positions, and means for intermittently operating the block to permit a step-by-step movement of the bar.

23. The combination with a progressive transmission gearing, of a shifting-bar for the gears, means acting to move the bar in one direction to shift the gears progressively from neutral to high-speed positions, and from reverse to neutral, means for moving said bar in the opposite direction and in opposition to said moving means for progressively shifting the gearing from high-speed through intermediate and low positions to neutral, and an intermittently movable member reciprocable in a path at right angles to the bar and engageable therewith for controlling the movement of the bar.

In testimony whereof, I have signed my name to this specification, in the presence of two subscribing witnesses.

ROY A. RALPH.

Witnesses:
 DORA LINCOLN RALPH,
 DWIGHT B. ELDRED.

Copies of this patent may be obtained for five cents each, by addressing the "Commissioner of Patents. Washington, D. C."